(12) United States Patent
Chen

(10) Patent No.: US 7,766,143 B1
(45) Date of Patent: Aug. 3, 2010

(54) BICYCLE REAR HUB WHOSE FREEWHEEL HAVING SMALLER DIAMETER AND SPECIFICATION

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 522 days.

(21) Appl. No.: 11/749,228

(22) Filed: May 16, 2007

(51) Int. Cl.
*B60B 27/06* (2006.01)
(52) U.S. Cl. ...................................... 192/64; 301/110.5
(58) Field of Classification Search .................... 192/64
See application file for complete search history.

(56) References Cited

U.S. PATENT DOCUMENTS 6,907,972 B2 * 6/2005 Chen ........................... 192/64

FOREIGN PATENT DOCUMENTS

GB 2127113 A * 4/1984

* cited by examiner

*Primary Examiner*—David D Le
*Assistant Examiner*—Ryan Dodd
(74) *Attorney, Agent, or Firm*—Alan Kamrath; Kamrath & Associates PA

(57) ABSTRACT

A rear hub for a bicycle includes a mandrel, a hub body, a first locking nut, a freewheel, an auxiliary threaded post, and a second locking nut. The mandrel has a primary threaded section and a secondary mounting portion which has a diameter smaller than that of the primary mounting portion. Thus, the secondary mounting portion of the mandrel has a smaller diameter so that the freewheel has a smaller diameter to reduce the tooth number of the driven gear to reduce the tooth number of the chainwheel to reduce the diameter of the chainwheel so as to reduce the whole volume and weight of the bicycle.

12 Claims, 6 Drawing Sheets

BICYCLE REAR HUB WHOSE FREEWHEEL HAVING SMALLER DIAMETER AND SPECIFICATION

BACKGROUND OF THE INVENTION

1. Field of the Invention

The present invention relates to a hub and, more particularly, to a rear hub for a bicycle.

2. Description of the Related Art

A conventional rear hub for a bicycle in accordance with the prior art shown in FIGS. 4-6 comprises a mandrel 20 having two ends each formed with a threaded section 21, a hub body 10 rotatably mounted on the mandrel 20 and having a side formed with a plurality of ratchet teeth 12, a freewheel 30 rotatably mounted on the mandrel 20 and having a first end provided with a oneway ratchet wheel 32 meshing with the ratchet teeth 12 of the hub body 10 to rotate the hub body 10 in a oneway direction only and a second end provided with a driven gear 33 meshing with a chain which meshes with a chainwheel, two locking nuts 22 each screwed onto the respective threaded section 21 of the mandrel 20 to limit the hub body 10 and the freewheel 30, two first bearings 42 mounted between the mandrel 20 and the hub body 10, and a plurality of second bearings 40 mounted between the mandrel 20 and the freewheel 30. The hub body 10 has an inside formed with a shaft hole 11 to allow passage of the mandrel 20. The freewheel 30 has an inside formed with a through hole 31 to allow passage of the second bearing 40. Thus, the chainwheel drives the chain to rotate the driven gear 33 which rotates the ratchet wheel 32 to rotate the hub body 10 in a oneway direction only.

However, the freewheel 30 has a diameter corresponding to that of the freewheel 30 so that the freewheel 30 is made to have a greater diameter to increase the tooth number of the driven gear 33 to increase the tooth number of the chainwheel to increase the diameter of the chainwheel so as to increase the whole volume and weight of the bicycle. In addition, the freewheel 30 and the chainwheel have a greater diameter and tooth number so that the chainwheel easily touches the ground when the bicycle is disposed at an inclined state during an acrobatic performance, thereby causing danger to the rider. Further, the mandrel 20 is made of a solid metallic material so that the mandrel 20 has a heavier weight, thereby increasing the whole weight of the bicycle.

BRIEF SUMMARY OF THE INVENTION

In accordance with the present invention, there is provided a rear hub for a bicycle, comprising a mandrel having a first end provided with a primary mounting portion which has a primary threaded section and a second end provided with a secondary mounting portion which has a diameter smaller than that of the primary mounting portion and has a secondary threaded section, a hub body rotatably mounted on the mandrel, a first locking nut screwed onto the primary threaded section of the primary mounting portion of the mandrel and rested on a first end of the hub body, a freewheel rotatably mounted on the secondary mounting portion of the mandrel and having a first end combined with a second end of the hub body to rotate the hub body, an auxiliary threaded post screwed onto the secondary threaded section of the secondary mounting portion of the mandrel to limit a second end of the freewheel and having a diameter equal to that of the primary mounting portion of the mandrel, and a second locking nut screwed onto the auxiliary threaded post.

The primary objective of the present invention is to provide a bicycle rear hub whose freewheel having smaller diameter and specification.

Another objective of the present invention is to provide a rear hub for a bicycle, wherein the secondary mounting portion of the mandrel has a smaller diameter so that the freewheel has a smaller diameter to reduce the tooth number of the driven gear to reduce the tooth number of the chainwheel to reduce the diameter of the chainwheel so as to reduce the whole volume of the bicycle.

A further objective of the present invention is to provide a rear hub for a bicycle, wherein the freewheel and the chainwheel have a smaller diameter and tooth number to prevent the chainwheel from touching the ground when the bicycle is disposed at an inclined state during an acrobatic performance, thereby protecting the rider's safety.

A further objective of the present invention is to provide a rear hub for a bicycle, wherein the secondary mounting portion of the mandrel has a smaller diameter so that the mandrel has a lighter weight, thereby reducing the whole weight of the bicycle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
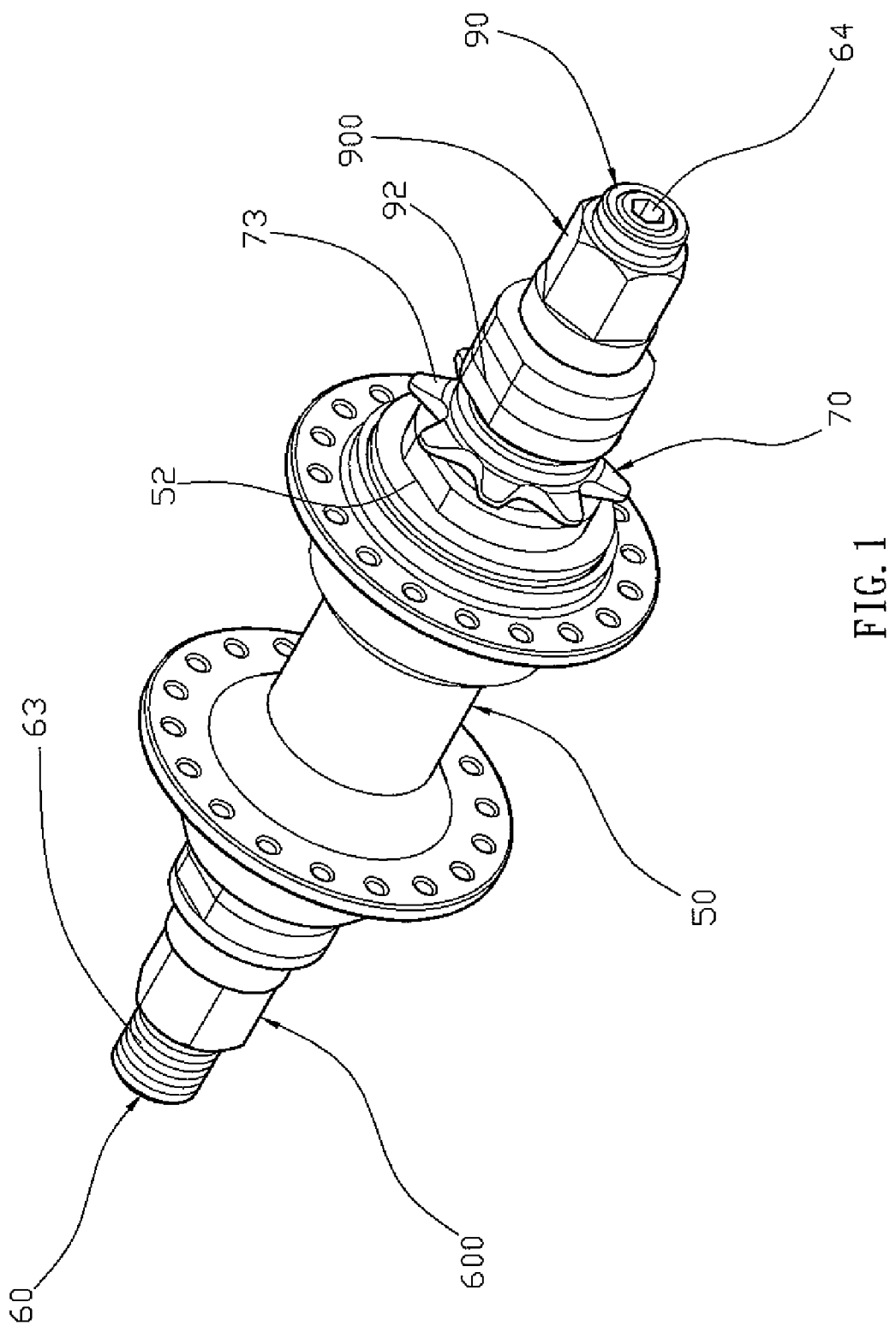
FIG. 1 is a perspective view of a rear hub for a bicycle in accordance with the preferred embodiment of the present invention.
Figure 2:
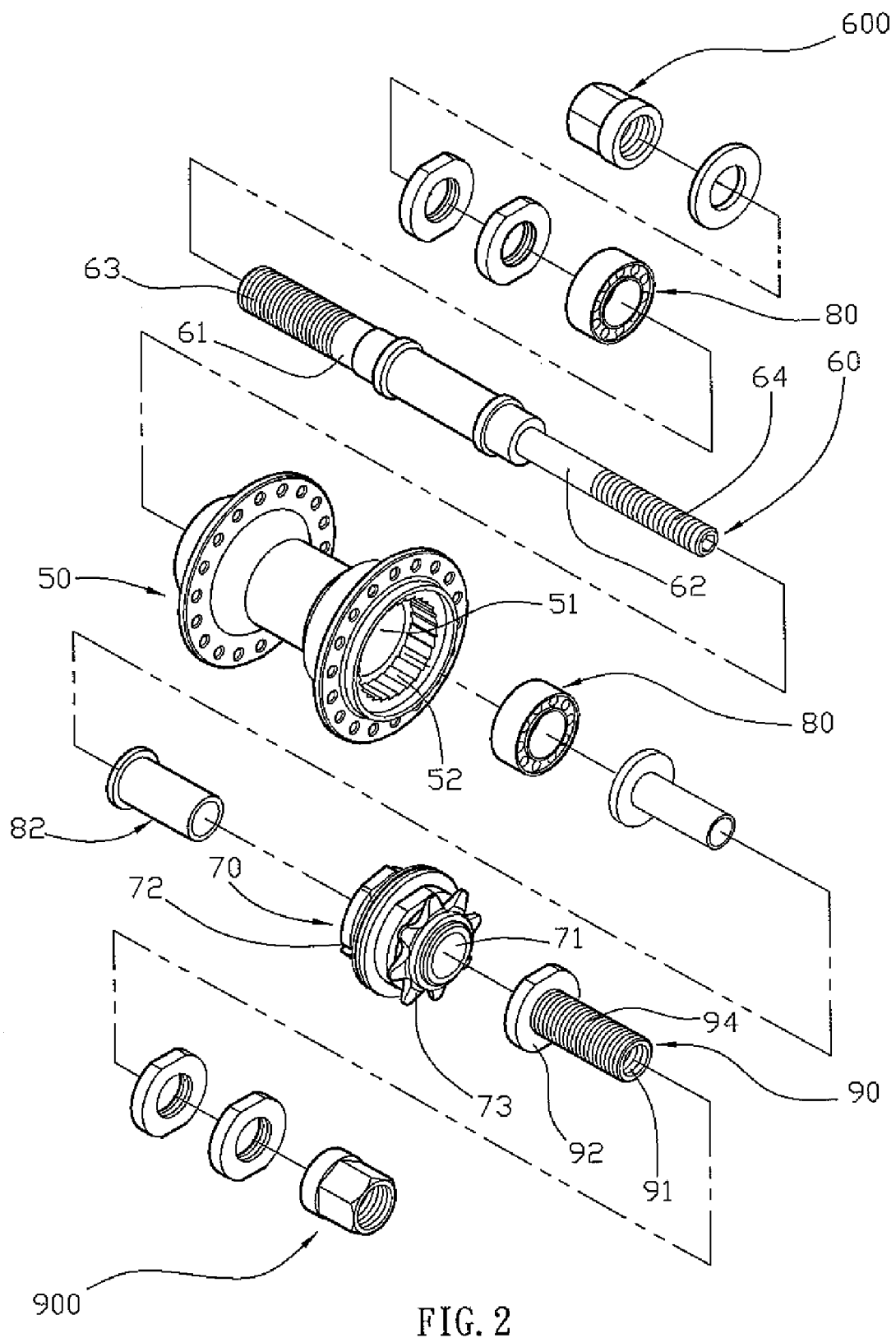
FIG. 2 is an exploded perspective view of the rear hub as shown in FIG. 1.
Figure 3:
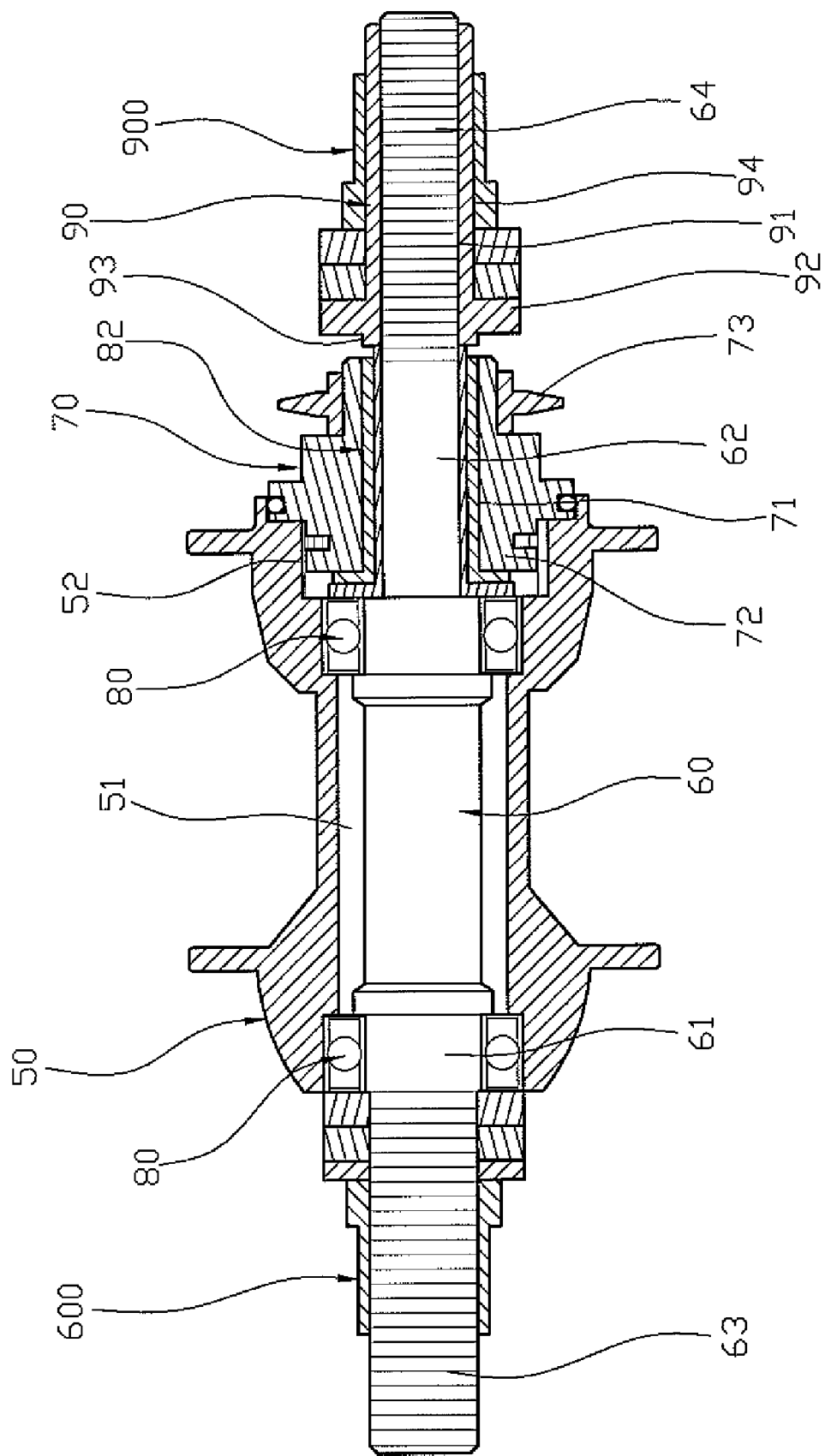
FIG. 3 is a front cross-sectional view of the rear hub as shown in FIG. 1.
Figure 4:
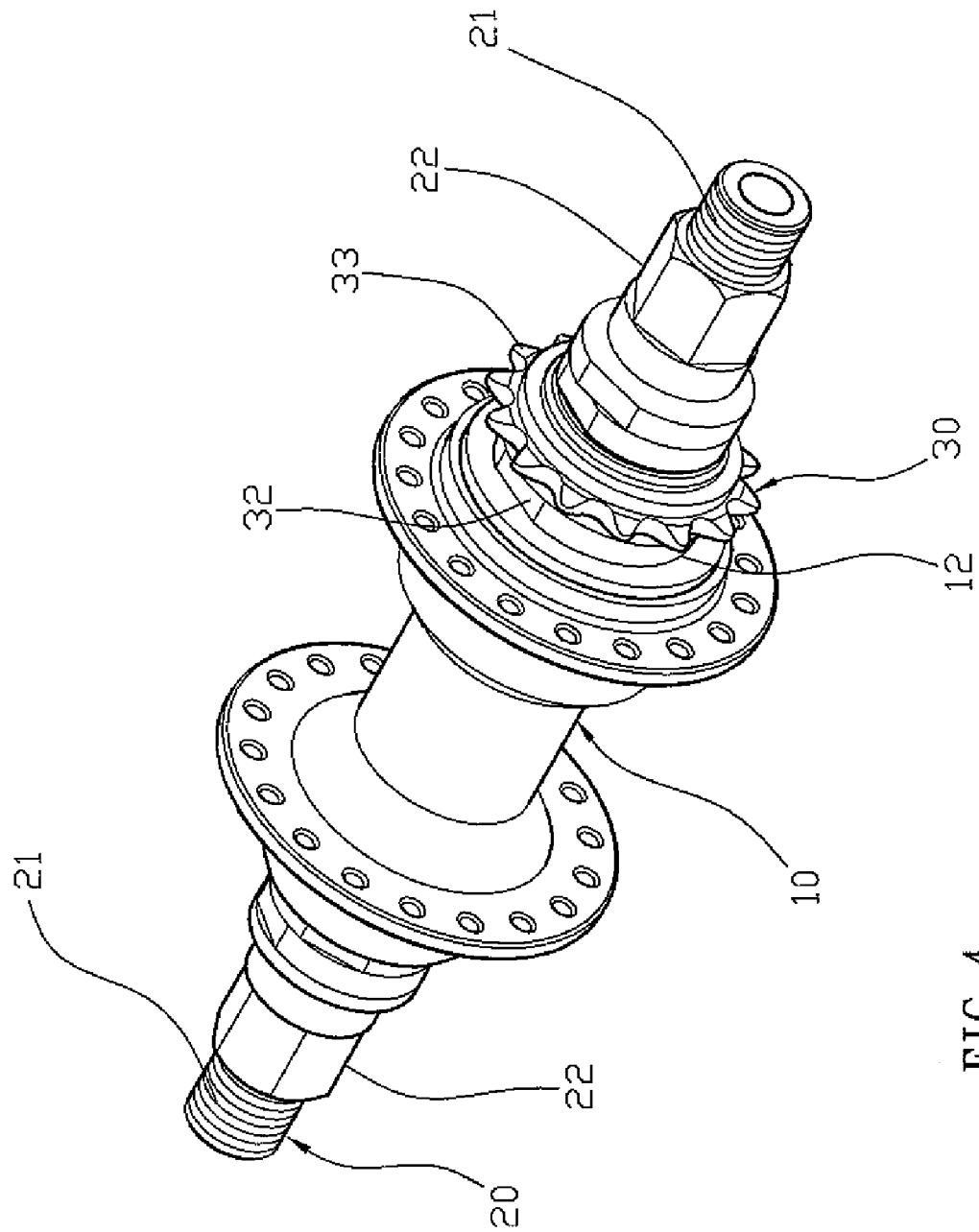
FIG. 4 is an exploded perspective view of a conventional rear hub for a bicycle in accordance with the prior art.
Figure 5:
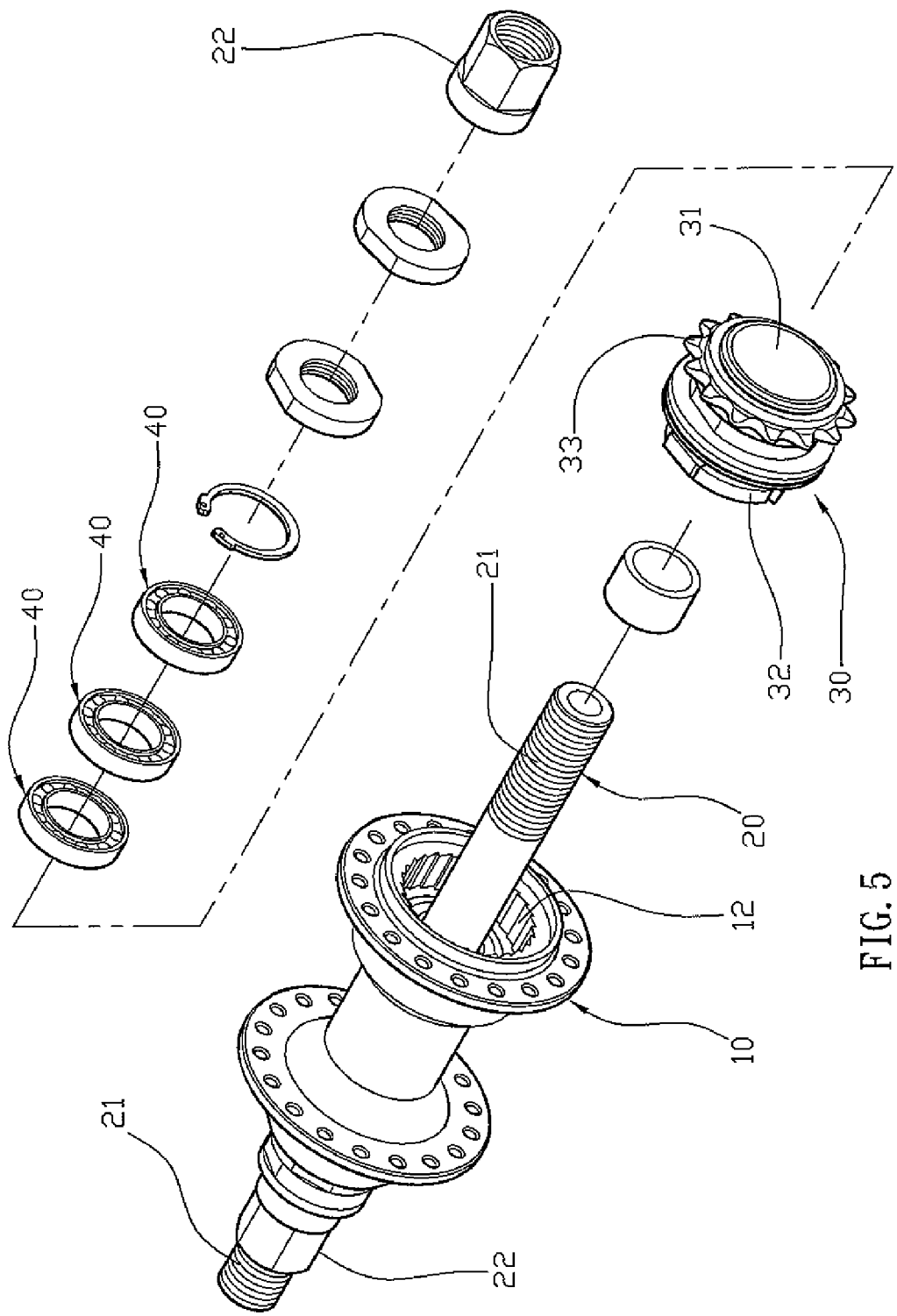
FIG. 5 is an exploded perspective view of the conventional rear hub as shown in FIG. 4.
Figure 6:
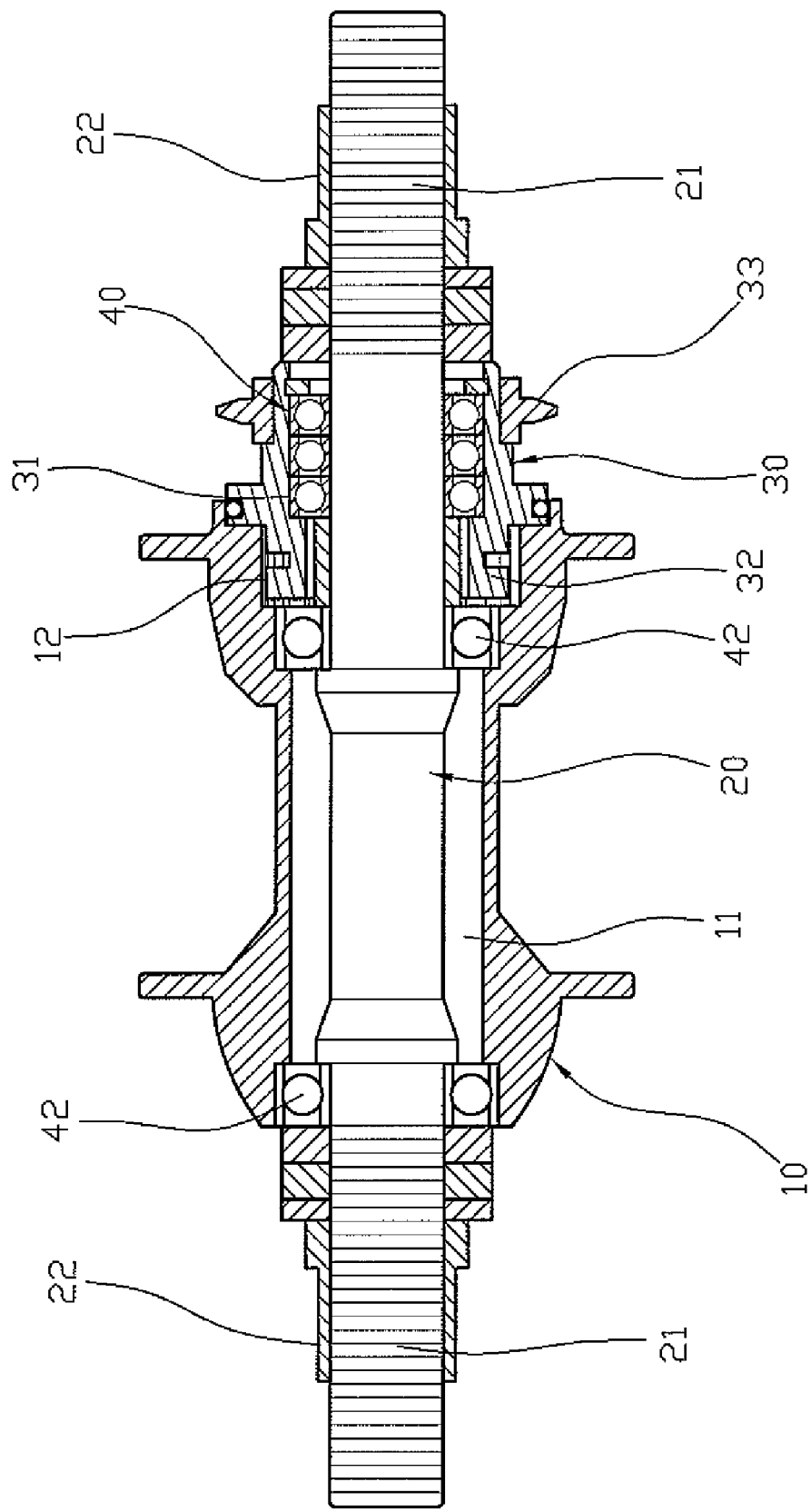
FIG. 6 is a front cross-sectional view of the conventional rear hub as shown in FIG. 4.

Referring to FIGS. 1-3, a rear hub for a bicycle in accordance with the preferred embodiment of the present invention comprises a mandrel 60 having a first end provided with a primary mounting portion 61 which has a primary threaded section 63 and a second end provided with a secondary mounting portion 62 which has a diameter smaller than that of the primary mounting portion 61 and has a secondary threaded section 64, a hub body 50 rotatably mounted on the mandrel 60, a first locking nut 600 screwed onto the primary threaded section 63 of the primary mounting portion 61 of the mandrel 60 and rested on a first end of the hub body 50, a freewheel 70 rotatably mounted on the secondary mounting portion 62 of the mandrel 60 and having a first end combined with a second end of the hub body 50 to rotate the hub body 50, an auxiliary threaded post 90 screwed onto the secondary threaded section 64 of the secondary mounting portion 62 of the mandrel 60 to limit a second end of the freewheel 70 and having a diameter equal to that of the primary mounting portion 61 of the mandrel 60, and a second locking nut 900 screwed onto the auxiliary threaded post 90.

The hub body 50 is located between the primary mounting portion 61 and the secondary mounting portion 62 of the mandrel 60 and has an inside formed with a shaft hole 51 to allow passage of the mandrel 60. The second end of the hub body 50 is formed with a plurality of ratchet teeth 52 connected to the shaft hole 51.

The auxiliary threaded post 90 has a diameter equal to that of the primary mounting portion 61 of the mandrel 60 so that the auxiliary threaded post 90 co-operates with the primary mounting portion 61 of the mandrel 60 to function as two opposite ends of the mandrel 60 with a equal diameter. The auxiliary threaded post 90 has an outer wall formed with an outer threaded portion 94 onto which the second locking nut 900 is screwed and an inner wall formed with a screw bore 91 screwed onto the secondary threaded section 64 of the secondary mounting portion 62 of the mandrel 60. The auxiliary threaded post 90 has an end portion formed with an enlarged limit flange 92 to stop the second locking nut 900. The limit flange 92 of the auxiliary threaded post 90 has a side formed with a protruding resting edge 93 (see FIG. 3) directed toward the freewheel 70 to limit the second end of the freewheel 70.

The rear hub further comprises two first bearings 80 mounted between the mandrel 60 and the hub body 50 and limited between the first locking nut 600 and the first end of the freewheel 70, wherein one of the first bearings 80 is mounted on the primary mounting portion 61 of the mandrel 60 and located between the first locking nut 600 and the first end of the hub body 50, and the other one of the first bearings 80 is located beside the secondary mounting portion 62 of the mandrel 60 and located between the second end of the hub body 50 and the first end of the freewheel 70. Each of the first bearings 80 is a ball bearing.

The rear hub further comprises at least one second bearing 82 mounted between the mandrel 60 and the freewheel 70 and limited between the other one of the first bearings 80 and the auxiliary threaded post 90. The second bearing 82 is mounted on the secondary mounting portion 62 of the mandrel 60 and extended through the freewheel 70 and has a first end located between the other one of the first bearings 80 and the freewheel 70 and a second end rested on the resting edge 93 of the limit flange 92 of the auxiliary threaded post 90. The second bearing 82 is a self-lubricating bearing.

The freewheel 70 has an inside formed with a through hole 71 to allow passage of the second bearing 82. The first end of the freewheel 70 is provided with a oneway ratchet wheel 72 meshing with the ratchet teeth 52 of the hub body 50 to rotate the hub body 50 in a oneway direction only. The second end of the freewheel 70 is provided with a driven gear 73 meshing with a chain which meshes with a chainwheel of the bicycle. Thus, the chainwheel drives the chain to rotate the driven gear 73 which rotates the ratchet wheel 72 to rotate the hub body 50 in a oneway direction only.

Accordingly, the secondary mounting portion 62 of the mandrel 60 has a smaller diameter so that the freewheel 70 has a smaller diameter to reduce the tooth number of the driven gear 73 to reduce the tooth number of the chainwheel to reduce the diameter of the chainwheel so as to reduce the whole volume of the bicycle. In addition, the freewheel 70 and the chainwheel have a smaller diameter and tooth number to prevent the chainwheel from touching the ground when the bicycle is disposed at an inclined state during an acrobatic performance, thereby protecting the rider's safety. Further, the secondary mounting portion 62 of the mandrel 60 has a smaller diameter so that the mandrel 60 has a lighter weight, thereby reducing the whole weight of the bicycle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A rear hub for a bicycle, comprising:
   a mandrel having a first end provided with a primary mounting portion which has a primary threaded section and a second end provided with a secondary mounting portion which has a diameter smaller than that of the primary mounting portion and has a secondary threaded section;
   a hub body rotatably mounted on the mandrel;
   a first locking nut screwed onto the primary threaded section of the primary mounting portion of the mandrel and rested on a first end of the hub body;
   a freewheel rotatably mounted on the secondary mounting portion of the mandrel and having a first end combined with a second end of the hub body to rotate the hub body;
   an auxiliary threaded post screwed onto the secondary threaded section of the secondary mounting portion of the mandrel to limit a second end of the freewheel and having an outer diameter equal to that of the primary mounting portion of the mandrel;
   a second locking nut screwed onto the auxiliary threaded post;
   wherein the auxiliary threaded post has an end portion formed as one piece with an enlarged limit flange to stop the second locking nut;
   the limit flange of the auxiliary threaded post has a side formed with a protruding resting edge directed toward the freewheel to limit the second end of the freewheel;
   the second end of the freewheel is provided with a driven gear;
   the hub body is located between the primary mounting portion and the secondary mounting portion of the mandrel;
   the hub body has an inside formed with a shaft hole to allow passage of the mandrel;
   the second end of the hub body is formed with a plurality of ratchet teeth;
   the first end of the freewheel is provided with a oneway ratchet wheel meshing with the ratchet teeth of the hub body to rotate the hub body in a oneway direction only.

2. The rear hub in accordance with claim 1, wherein the auxiliary threaded post has an outer wall formed with an outer threaded portion onto which the second locking nut is screwed.

3. The rear hub in accordance with claim 1, wherein the auxiliary threaded post has an inner wall formed with a screw bore screwed onto the secondary threaded section of the secondary mounting portion of the mandrel;
   the screw bore of the auxiliary threaded post extends through a whole axial length of the auxiliary threaded post.

4. The rear hub in accordance with claim 1, wherein the ratchet teeth of the hub body are connected to the shaft hole.

5. The rear hub in accordance with claim 1, further comprising two first bearings mounted between the mandrel and the hub body and limited between the first locking nut and the first end of the freewheel.

6. The rear hub in accordance with claim 5, wherein one of the first bearings is mounted on the primary mounting portion of the mandrel and located between the first locking nut and the first end of the hub body, and the other one of the first bearings is located beside the secondary mounting portion of the mandrel and located between the second end of the hub body and the first end of the freewheel.

7. The rear hub in accordance with claim 5, wherein each of the first bearings is a ball bearing.

8. The rear hub in accordance with claim 6, further comprising at least one second bearing mounted between the mandrel and the freewheel and limited between the other one of the first bearings and the auxiliary threaded post.

9. The rear hub in accordance with claim 8, wherein:
the auxiliary threaded post is located outside of and spaced from the freewheel;
the limit flange of the auxiliary threaded post has a first side abutting the second locking nut and has a second side formed with the protruding resting edge;
the second bearing has a first end located between the other one of the first bearings and the freewheel and a second end rested on the resting edge of the limit flange of the auxiliary threaded post.

10. The rear hub in accordance with claim 8, wherein the second bearing is mounted on the secondary mounting portion of the mandrel and extended through the freewheel.

11. The rear hub in accordance with claim 8, wherein the second bearing is a self-lubricating bearing.

12. The rear hub in accordance with claim 9, wherein
the freewheel has an inside formed with a through hole to allow passage of the second bearing;
the limit flange of the auxiliary threaded post has a size greater than that of the through hole of the freewheel.

* * * * *